US012736792B2

(12) United States Patent
Pan

(10) Patent No.: US 12,736,792 B2
(45) Date of Patent: Sep. 15, 2026

(54) MICROSCOPE OBJECTIVE LENS

(71) Applicant: AAC OPTICS (CHANGZHOU) CO., LTD., Changzhou City (CN)

(72) Inventor: Shiqi Pan, Changzhou (CN)

(73) Assignee: AAC OPTICS (CHANGZHOU) CO., LTD., Changzhou City (CN)

( * ) Notice: Subject to any disclaimer, the term of this patent is extended or adjusted under 35 U.S.C. 154(b) by 293 days.

(21) Appl. No.: 18/399,800

(22) Filed: Dec. 29, 2023

(65) Prior Publication Data

US 2025/0102787 A1 Mar. 27, 2025

(30) Foreign Application Priority Data

Sep. 22, 2023 (CN) ......................... 202311238168.1

(51) Int. Cl.
*G02B 21/02* (2006.01)
*G02B 9/64* (2006.01)

(52) U.S. Cl.
CPC ............... *G02B 21/02* (2013.01); *G02B 9/64* (2013.01)

(58) Field of Classification Search
CPC ......... G02B 21/02; G02B 23/243; G02B 9/64
See application file for complete search history.

(56) References Cited

U.S. PATENT DOCUMENTS

2012/0293863 A1* 11/2012 McMullen ............. G02B 21/02 359/385
2016/0266370 A1* 9/2016 Uchida ................ G02B 21/361

* cited by examiner

*Primary Examiner* — Cara E Rakowski
(74) *Attorney, Agent, or Firm* — Wiersch Law Group

(57) ABSTRACT

The present disclosure relates to the field of camera optical lenses, and discloses a microscope objective lens. The microscope objective lens includes from an object side to an image side: a first lens, a second lens, a third lens, a fourth lens, and a fifth lens, a sixth lens, a seventh lens, an eighth lens and a ninth lens, a following relational expression is satisfied: $0.19 \le WD/TTL \le 0.36$; $4.00 \le NA*f \le 8.00$; $7.00 \le f678/f9 \le 16.00$; and $-10.00 \le (R17+R18)/(R17-R18) \le -1.50$. The microscope objective lens provided by the present disclosure has good optical performance of imaging quality, and can meet the requirements of wider working wave band and higher magnification.

12 Claims, 9 Drawing Sheets

MICROSCOPE OBJECTIVE LENS

TECHNICAL FIELD

The present disclosure relates to the field of camera optical lenses, in particular to a microscope objective lens suitable for an industrial microscope.

BACKGROUND

The microscope objective lens can complete its specific imaging function with a certain field of view, focal length and relative aperture, but these optical characteristic parameters are mutually restricted by the optical imaging principle. The microscope objective lens needs to have the characteristic of high resolution by a large numerical aperture, but the higher the magnification of the microscope objective lens, the larger the numerical aperture, the more obvious the influence of thickness and refractive index changes on the imaging quality of the microscope, and it is generally difficult to consider both higher imaging quality and higher magnification. In addition, with the development of technology and the increase of diversified requirements of users and the requirements of the system on the imaging quality are improving, the nine-piece lens gradually appearing in the lens design. There is an urgent need for microscope objective lenses with good optical performance and wider working wave band, higher magnification.

SUMMARY

In view of the above problems, an object of the present disclosure is to provide a microscope objective lens, which can meet the requirements of wider working wave band and higher magnification while having good optical performance of imaging quality.

In order to solve the above technical problem, an embodiment of the present disclosure provides a microscope objective lens. The microscope objective lens includes from an object side to an image side: a first lens, a second lens, a third lens, a fourth lens, a fifth lens, a sixth lens, a seventh lens, an eighth lens and a ninth lens;

wherein a distance from an object-side surface of the first lens to an observed object is WD, a total optical length from the object-side surface of the first lens to an image plane of the camera optical lens along an optic axis of the microscope objective lens is TTL, an object numerical aperture of the microscope objective lens is NA, a focal length of the microscope objective lens is f, an equivalent focal length of the sixth lens, the seventh lens and the eighth lens is f678, a focal length of the ninth lens is f9, a curvature radius of an object-side surface of the ninth lens is R17, a curvature radius of an image-side surface of the ninth lens is R18, and following relational expressions are satisfied:

$$0.19 \leq WD/TTL \leq 0.36;$$

$$4.00 \leq NA \times f \leq 8.00;$$

$$7.00 \leq f678/f9 \leq 16.00; \text{ and}$$

$$-10.00 \leq (R17 + R18)/(R17 - R18) \leq -1.50.$$

As an improvement, a refractive index of the second lens is n2, and a following relational expression is satisfied:

$$n2 \geq 2.00.$$

As an improvement, a focal length of the third lens is f3, and a following relational expression is satisfied:

$$3.00 \leq f3/f \leq 6.00.$$

The microscope objective lens of claim 1, wherein the first lens has a negative refractive power, the object-side surface of the first lens is concave in a paraxial region, and an image-side surface of the first lens is concave in the paraxial region; and a focal length of the first lens is f1, a curvature radius of the object-side surface of the first lens is R1, a curvature radius of the image-side surface of the first lens is R2, an on-axis thickness of the first lens is d1, and following relational expressions are satisfied:

$$0.87 \leq f1/f \leq 0.66;$$

$$-0.42 \leq (R1 + R2)/(R1 - R2) \leq -0.16; \text{ and}$$

$$0.01 \leq d1/TTL \leq 0.02.$$

As an improvement, the second lens has a positive refractive power, and an object-side surface of the second lens is convex in a paraxial region; and a focal length of the second lens is f2, a curvature radius of the object-side surface of the second lens is R3, a curvature radius of an image-side surface of the second lens is R4, an on-axis thickness of the second lens is d3, and following relational expressions are satisfied:

$$1.40 \leq f2/f \leq 1.59;$$

$$-1.85 \leq (R3 + R4)/(R3 - R4) \leq -0.49; \text{ and}$$

$$0.01 \leq d3/TTL \leq 0.05.$$

As an improvement, the third lens has a positive refractive power, an object-side surface of the third lens is concave in a paraxial region, and an image-side surface of the third lens is convex in the paraxial region; and a curvature radius of the object-side surface of the third lens is R5, a curvature radius of the image-side surface of the third lens is R6, an on-axis thickness of the third lens is d5, and following relational expressions are satisfied:

$$4.50 \leq (R5 + R6)/(R5 - R6) \leq 34.00; \text{ and}$$

$$0.15 \leq d5/TTL \leq 0.17.$$

As an improvement, the fourth lens has a negative refractive power, and an image-side surface of the fourth lens is concave in a paraxial region; and a focal length of the fourth lens is f4, and an on-axis thickness of the fourth lens is d7, and following relational expressions are satisfied:

$$2.97 \le f4/f \le 1.96; \text{ and}$$

$$0.02 \le d7/TTL \le 0.15.$$

As an improvement, the fifth lens has a positive refractive power, an object-side surface of the fifth lens is convex in a paraxial region, and an image-side surface of the fifth lens is convex in the paraxial region; and a focal length of the fifth lens is f5, a curvature radius of the object-side surface of the fifth lens is R9, a curvature radius of the image-side surface of the fifth lens is R10, an on-axis thickness of the fifth lens is d9, and following relational expressions are satisfied:

$$1.68 \le f5/f \le 1.87;$$

$$-0.13 \le (R9+R10)/(R9-R10) \le -0.09; \text{ and}$$

$$0.05 \le d9/TTL \le 0.07.$$

As an improvement, the sixth lens has a positive refractive power, an object-side surface of the sixth lens is convex in a paraxial region, and an image-side surface of the sixth lens is convex in the paraxial region; and a focal length of the sixth lens is f6, a curvature radius of the object-side surface of the sixth lens is R11, a curvature radius of the image-side surface of the sixth lens is R12, an on-axis thickness of the sixth lens is d11, and following relational expressions are satisfied:

$$1.85 \le f6/f \le 2.08;$$

$$-0.39 \le (R11+R12)/(R11-R12) \le -0.14; \text{ and}$$

$$0.07 \le d11/TTL \le 0.12.$$

As an improvement, the seventh lens has a negative refractive power, an object-side surface of the seventh lens is concave in a paraxial region, and an image-side surface of the seventh lens is concave in the paraxial region; and a focal length of the seventh lens is f7, a curvature radius of the object-side surface of the seventh lens is R13, a curvature radius of the image-side surface of the seventh lens is R14, an on-axis thickness of the seventh lens is d13, and following relational expressions are satisfied:

$$1.10 \le f7/f \le 0.94;$$

$$0.11 \le (R13+R14)/(R13-R14) \le 0.38; \text{ and}$$

$$0.01 \le d13/TTL \le 0.02.$$

As an improvement, an object-side surface of the eighth lens is convex in a paraxial region, and an image-side surface of the eighth lens is convex in the paraxial region; and a focal length of the eighth lens is f8, a central curvature radius of the object-side surface of the eighth lens is R15, a central curvature radius of the image-side surface of the eighth lens is R16, an on-axis thickness of the eighth lens is d15, and following relational expressions are satisfied:

$$1.90 \le f8/f \le 2.36;$$

$$-0.55 \le (R15+R16)/(R15-R16) \le -0.31; \text{ and}$$

$$0.02 \le d15/TTL \le 0.07.$$

The microscope objective lens as described in 1, wherein the ninth lens has a positive refractive power, the object-side surface of the ninth lens is convex in a paraxial region, and the image-side surface of the ninth lens is concave in the paraxial region;

an on-axis thickness of the ninth lens is d17, following relational expressions are satisfied:

$$1.77 \le f9/f \le 2.31; \text{ and}$$

$$0.06 \le d17/TTL \le 0.13.$$

As an improvement, the first lens, the second lens, the third lens, the fourth lens, the fifth lens, the sixth lens, the seventh lens, the eighth lens and the ninth lens are all made of glass.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to more clearly illustrate objectives, technical solutions, and advantages of the embodiments of the present disclosure, the technical solutions in the embodiments of the present disclosure are clearly and completely described in details with reference to the accompanying drawings. The described embodiments are merely part of the embodiments of the present disclosure rather than all of the embodiments. All other embodiments obtained by those skilled in the art based on the embodiments of the present disclosure shall fall into the protection scope of the present disclosure.

Embodiment 1

Figure 1:
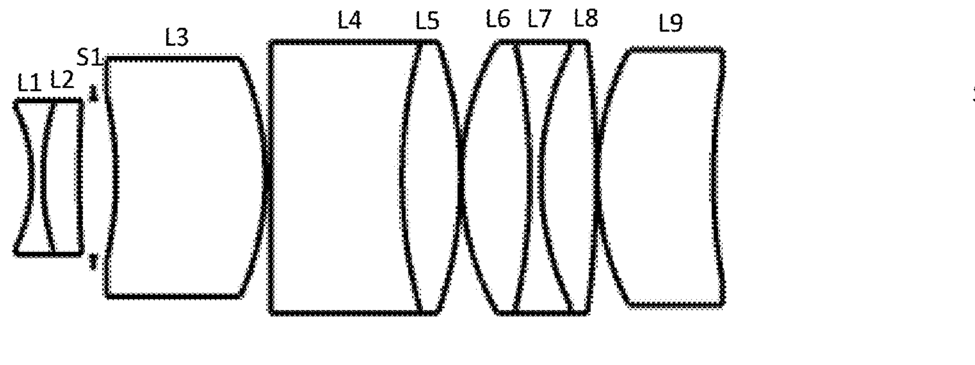
FIG. 1 is a structural schematic diagram of a microscope objective lens according to Embodiment 1 of the present disclosure.

Referring to the drawings, the present disclosure provides a microscope objective lens 10. FIG. 1 shows a microscope objective lens 10 according to Embodiment 1 of the present disclosure, and the microscope objective lens 10 includes nine lenses. The microscope objective lens 10 includes from an object side to an image side: a first lens L1, a second lens L2, a third lens L3, a fourth lens L4, a fifth lens L5, a sixth lens L6, a beam splitting prism BS, an aperture 51, a seventh lens L7, an eighth lens L8, and a ninth lens L9. An optical element such as an optical filter may be provided between a ninth lens L9 and an image surface Si.

A distance from the object-side surface of the first lens to the observed object is defined as WD, a total optical length from the object-side surface of the first lens to an image plane of the camera optical lens along an optic axis of the microscope objective lens 10 is defined as TTL, $0.19 \le WD/TTL \le 0.36$, a ratio of the distance from the object-side surface of the first lens L1 to the observed object to the total optical length from the object-side surface of the first lens to an image plane of the camera optical lens along an optic axis TTL is specified, within the range of the relational expression, the proper distance between the microscope objective lens 10 and the observed object can be ensured, so that the microscope objective lens 10 has good operability, and meanwhile, a reasonable space is provided for configuring the lens of the microscope objective lens 10 to correct the aberration.

An object numerical aperture of the microscope objective lens 10 is defined as NA, a focal length of the microscope objective lens 10 is defined as f, $4.00 \le NA*f \le 8.00$, the range of the product of the objective numerical aperture NA and the focal length f is specified, within the range of the relational expression, the magnification of the microscope objective lens 10 can be maintained, and a wider field of view is obtained.

An equivalent focal length of the sixth lens L6, the seventh lens L7, and the eighth lens L8 is defined as f678, a focal length of the ninth lens L9 is defined as f9, $7.00 \le f678/f9 \le 16.00$, and a focal length of the object second lens group is specified, that is, a ratio of the equivalent focal length f678 of the sixth lens L6, the seventh lens L7, and the eighth lens L8 to the focal length f9 of the ninth lens, and the optical focal length of the microscope objective lens 10 can be reasonably allocated, light can be smoothly propagated, so that the microscope objective lens 10 has better imaging quality and lower sensitivity.

A curvature radius of an object-side surface of the ninth lens L9 is defined as R17, a curvature radius of an image-side surface of the ninth lens is defined as R18, $-10.00 \le (R17+R18)/(R17-R18) \le -1.50$, a shape of the ninth lens L9 is specified, a deflection degree of light passing through the microscope objective lens 10 can be mitigated, thereby effectively reducing aberration, and the chromatic aberration $|LC| \le 1.0$ μm.

When the distance from the object-side surface to the observed object, the total optical length from the object-side surface of the first lens to an image plane of the camera optical lens along an optic axis, the object numerical aperture, the focal length of the microscope objective lens 10, the focal length of the related lens, and the curvature radius of the object-side surface and image-side surface of the related lens of the microscope objective lens 10 of the present disclosure satisfy the above relational expression, the microscope objective lens 10 may have good optical performance while having a wider working wave band and a higher magnification, so that the magnification reaches 10 or more.

A refractive index of the second lens L2 is defined as n2, and the following relational expression is satisfied: $n2 \ge 2.00$, which specifies the refractive index of the second lens L2 of the microscope objective lens 10, and the front-end lens of the microscope objective lens 10 optionally selects a high-refractive-index material, which is beneficial to reducing the aperture of the front-end lens and improving the imaging quality of the microscope objective lens 10.

A focal length of the third lens L3 is defined as f3, a following relational expression is satisfied: $3.00 \le f3/f \le 6.00$, a ratio of a focal length f3 of the third lens L3 to a focal length f of the microscope objective lens 10 is specified, and within the range of the relational expression, a deflection degree of light entering the first lens group on the image side can be effectively controlled, distortion of the microscope objective lens 10 can be effectively controlled, so that $|Distortion| \le 0.7\%$, and it is ensured that the image is not distorted in a large field of view. In this embodiment, the first lens L1 is made of glass, the second lens L2 is made of glass, the third lens L3 is made of glass, the fourth lens L4 is made of glass, the fifth lens L5 is made of glass, the sixth lens L6 is made of glass, the seventh lens L6 is made of glass, the eighth lens L2 is made of glass, and the ninth lens L4 is made of glass.

In this embodiment, an object-side surface of the first lens L1 is concave in a paraxial region, an image-side surface of the first lens L1 is concave in the paraxial region, and the first lens L1 has a negative refractive power. In other optional embodiments, the object-side surface and the image-side surface of the first lens L1 may also be provided with other concave and convex distributions, and the first lens L1 may also have a positive refractive power.

A focal length of the first lens L1 is f1, a following relational expression is satisfied: $0.87 \le f1/f \le 0.66$, through reasonable distribution of refractive powers, the system has better imaging quality and lower sensitivity.

A curvature radius of an object-side surface of the first lens L1 is defined as R1, and a curvature radius of an image-side surface of the first lens L1 is defined as R2, a following relational expression is satisfied: $-0.42 \le (R1+R2)/(R1-R2) \le -0.16$, a shape of the first lens is reasonably controlled, so that the first lens can effectively correct the spherical aberration of the system.

An on-axis thickness of the first lens L1 is d1, a following relational expression is satisfied: $0.01 \le d1/TTL \le 0.02$, which is beneficial to controlling the thickness of the lens and the total length of the camera lens.

In this embodiment, an object-side surface of the second lens L2 is convex in a paraxial region, an image-side surface of the second lens L2 is concave in the paraxial region, and the second lens L2 has a positive refractive power. In other optional embodiments, the object-side surface and the image-side surface of the second lens L2 may also be provided with other concave and convex distributions, and the second lens L2 may also have a negative refractive power.

A focal length of the second lens L2 is f2, a following relational expression is satisfied: $1.40 \le f2/f < 1.59$, through reasonable distribution of refractive powers, the system has better imaging quality and lower sensitivity.

A curvature radius of an object-side surface of the second lens L2 is R3, and a curvature radius of an image-side surface of the second lens L2 is R4, a following relational expression is satisfied: $-1.85 \le (R3+R4)/(R3-R4) \le -0.49$, which specifies a shape of the second lens L2, and within the specified range of the relational expression, the deflection degree of light passing through the lens can be mitigated, thereby effectively reducing aberration.

An on-axis thickness of the second lens L2 is d3, a following relational expression is satisfied: $0.01 \le d3/TTL \le 0.05$, which is beneficial to controlling the thickness of the lens and the total length of the camera lens.

In this embodiment, an object-side surface of the third lens L3 is concave in a paraxial region, an image-side surface of the third lens L3 is convex in the paraxial region, and the third lens L3 has a positive refractive power. In other optional embodiments, the object-side surface and the image-side surface of the third lens L3 may also be provided with other concave and convex distributions, and the third lens L3 may also have a negative refractive power.

A curvature radius of an object-side surface of the third lens L3 is R5, and a curvature radius of an image-side surface of the third lens L3 is R6, a following relational expression is satisfied: $4.50 \le (R5+R6)/(R5-R6) \le 34.00$, which specifies a shape of the third lens L3, and within the specified range of the relational expression, the deflection degree of light passing through the lens can be mitigated, thereby effectively reducing aberration.

An on-axis thickness of the third lens element L3 is d5, a following relational expression is satisfied: $0.15 \le d5/TTL \le 0.17$, which is beneficial to controlling the thickness of the lens and the total length of the camera lens.

In this embodiment, an object-side surface of the fourth lens L4 is convex in a paraxial region, an image-side surface of the fourth lens L4 is concave in the paraxial region, and the fourth lens L4 has a negative refractive power. In other optional embodiments, the object-side surface and the image-side surface of the fourth lens L4 may also be provided with other concave and convex distributions, and the fourth lens L4 may also have a positive refractive power.

A focal length of the fourth lens L4 is f4, a following relational expression is satisfied: $2.97 \le f4/f \le 1.96$, which specifies a ratio of the focal length f4 of the fourth lens L4 to the system focal length f, and helps improve the performance of the optical system within the range of the relational expression.

An on-axis thickness of the fourth lens L4 is d7, a following relational expression is satisfied: $0.02 \le d7/TTL \le 0.15$, which is beneficial to controlling the thickness of the lens and the total length of the camera lens.

In this embodiment, an object-side surface of the fifth lens L5 is convex in a paraxial region, an image-side surface of the fifth lens L5 is convex in the paraxial region, and the fifth lens L5 has a positive refractive power. In other optional embodiments, the object-side surface and the image-side surface of the fifth lens L5 may also be provided with other concave and convex distributions, and the fifth lens L5 may also have negative refractive power.

A focal length of the fifth lens L5 is f5, a following relational expression is satisfied: $1.68 \le f5/f \le 1.87$, which specifies a ratio of the focal length f5 of the fifth lens L5 to the system focal length f, and helps improve the performance of the optical system within the range of the relational expression.

A curvature radius of an object-side surface of the fifth lens L5 is R9, and a curvature radius of an image-side surface of the fifth lens L5 is R10, a following relational expression is satisfied: $-0.13 \le (R9+R10)/(R9-R10) \le 0.09$, a shape of the fifth lens L5 is specified, and within a specified range of the relational expression, a deflection degree of light passing through the lens can be mitigated, thereby effectively reducing aberration.

An on-axis thickness of the fifth lens L5 is d9, a following relational expression is satisfied: $0.05 \le d9/TTL \le 0.07$, which is beneficial to controlling the thickness of the lens and the total length of the camera lens.

In this embodiment, an object-side surface of the sixth lens L6 is convex in a paraxial region, an image-side surface of the sixth lens L6 is convex in the paraxial region, and the sixth lens L6 has a positive refractive power. In other optional embodiments, the object-side surface and the image-side surface of the sixth lens L6 may also be provided with other concave and convex distributions, and the sixth lens L6 may also have a negative refractive power.

A focal length of the sixth lens L6 is f6, a following relational expression is satisfied: $1.85 \le f6/f < 2.08$, which specifies a ratio of the focal length f6 of the sixth lens L6 to the system focal length f, and helps improve the performance of the optical system within the range of the relational expression.

A curvature radius of an object-side surface of the sixth lens L6 is R11, and a curvature radius of an image-side surface of the sixth lens L6 is R12, a following relational expression is satisfied: $-0.39 \le (R11+R12)/(R11-R12) \le -0.14$, a shape of the sixth lens L6 is specified, and within a specified range of the relational expression, a deflection degree of light passing through the lens can be mitigated, thereby effectively reducing aberration.

An on-axis thickness of the sixth lens L6 is d11, a following relational expression is satisfied: $0.07 \le d11/TTL \le 0.12$, which is beneficial to controlling the thickness of the lens and the total length of the camera lens.

In this embodiment, an object-side surface of the seventh lens L7 is concave in a paraxial region, an image-side surface of the seventh lens L7 is concave in the paraxial region, and the seventh lens L7 has a negative refractive power. In other optional embodiments, the object-side surface and the image-side surface of the seventh lens L7 may also be provided with other concave and convex distributions, and the seventh lens L7 may also have a positive refractive power.

A focal length of the seventh lens L7 is f7, a following relational expression is satisfied: $1.10 \le f7/f \le 0.94$, which specifies a ratio of the focal length f7 of the seventh lens L7 to the focal length f of the system, and helps to improve the performance of the optical system within the range of the relational expression.

A curvature radius of an object-side surface of the seventh lens L7 is R13, a curvature radius of an image-side surface of the seventh lens L7 is R14, and a following relational expression is satisfied: $0.11 \le (R13+R14)/(R13-R14) \le 0.38$. A shape of the seventh lens L7 is specified, and within a specified range of the relational expression, a deflection degree of light passing through the lens can be mitigated, thereby effectively reducing aberration.

An on-axis thickness of the seventh lens L7 is d13, a following relational expression is satisfied: $0.01 \le d13/TTL \le 0.02$, which is beneficial to controlling the thickness of the lens and the total length of the camera lens.

In this embodiment, an object-side surface of the eighth lens L8 is convex in a paraxial region, an image-side surface of the eighth lens L8 is concave in the paraxial region, and the eighth lens L8 has a positive refractive power. In other optional embodiments, the object-side surface and the image-side surface of the eighth lens L8 may also be provided with other concave and convex distributions, and the eighth lens L8 may also have a negative refractive power.

A focal length of the eighth lens L8 is f8, a following relational expression is satisfied: $1.90<f8/f\leq 2.36$, which specifies a ratio of the focal length f8 of the eighth lens L8 to the system focal length f, and helps to improve the performance of the optical system within the range of the relational expression.

A central curvature radius of an object-side surface of the eighth lens L8 is R15, and a central curvature radius of an image-side surface of the seventh lens is R16, a following relational expression is satisfied: $-0.55\leq(R15+R16)/(R15-R16)\leq-0.31$. A shape of the eighth lens L8 is specified, and within a specified range of the relational expression, a deflection degree of light passing through the lens can be mitigated, thereby effectively reducing aberration.

An on-axis thickness of the eighth lens L8 is d15, a following relational expression is satisfied: $0.02\leq d15/TTL\leq 0.07$, which is beneficial to controlling the thickness of the lens and the total length of the camera lens.

In this embodiment, an object-side surface of the ninth lens L9 is convex in a paraxial region, an image-side surface of the ninth lens L9 is concave in the paraxial region, and the ninth lens L9 has a positive refractive power. In other optional embodiments, the object-side surface and the image-side surface of the ninth lens L9 may also be provided with other concave and convex distributions, and the ninth lens L9 may also have a negative refractive power.

A focal length of the ninth lens L9 is f9, a following relational expression is satisfied: $1.77\leq f9/f\leq 2.31$, which specifies a ratio of the focal length f9 of the ninth lens L9 to the system focal length f, and helps to improve the performance of the optical system within the range of the relational expression.

An on-axis thickness of the ninth lens L9 is d17, a following relational expression is satisfied: $0.06\leq d17/TTL\leq 0.13$, which is beneficial to controlling the thickness of the lens and the total length of the camera lens.

In this embodiment, the microscope objective lens 10 and the tube lens are used together, and the focal length of the tube lens is 200.00 mm.

The microscope objective lens 10 of the present disclosure will be described as follows by examples. The symbols recited in each example are as follows. The units of the focal length, the on-axis distance, the curvature radius and the on-axis thickness are mm.

TTL: the unit of the total optical length from the object-side surface of the first lens to an image plane of the camera optical lens along an optic axis (an on-axis distance from the object-side surface of the first lens L1 to the image plane) is mm;

Optionally, the object-side surface and/or the image-side surface of the lens may be further provided with an inflection point and/or a stationary point, so as to meet high-quality imaging requirements, specific implementable embodiments are described below.

Table 1 shows design data of the microscope objective lens 10 according to Embodiment 1 of the present disclosure.

TABLE 1

| | R | d | | nd | | vd | |
|---|---|---|---|---|---|---|---|
| S1 | ∞ | d0 = | −5.790 | | | | |
| R1 | −15.055 | d1 = | 1.050 | nd1 | 1.6180 | v1 | 63.41 |
| R2 | 24.448 | d2 = | 0.000 | | | | |
| R3 | 24.448 | d3 = | 3.400 | nd2 | 2.0007 | v2 | 25.43 |
| R4 | 98.159 | d4 = | 3.460 | | | | |
| R5 | −34.593 | d5 = | 14.030 | nd3 | 1.8830 | v3 | 40.85 |
| R6 | −27.716 | d6 = | 0.560 | | | | |
| R7 | ∞ | d7 = | 12.280 | nd4 | 1.8501 | v4 | 30.06 |
| R8 | 45.637 | d8 = | 0.000 | | | | |
| R9 | 45.637 | d9 = | 5.510 | nd5 | 1.5928 | v5 | 68.34 |
| R10 | −38.554 | d10 = | 0.100 | | | | |
| R11 | 25.737 | d11 = | 6.400 | nd6 | 1.4378 | v6 | 94.52 |
| R12 | −57.370 | d12 = | 0.000 | | | | |
| R13 | −57.370 | d13 = | 1.050 | nd7 | 1.8467 | v7 | 23.79 |
| R14 | 27.554 | d14 = | 0.000 | | | | |
| R15 | 27.554 | d15 = | 5.210 | nd8 | 1.4565 | v8 | 90.47 |
| R16 | −93.069 | d16 = | 0.100 | | | | |
| R17 | 25.565 | d17 = | 10.870 | nd9 | 1.9460 | v9 | 17.94 |
| R18 | 55.337 | d18 = | 25.349 | | | | |

The meaning of each symbol is as follows.

S1: aperture;

R: curvature radius of the optical surface, and center curvature radius of the lens;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of the object-side surface of the sixth lens L6;

R12: curvature radius of the image-side surface of the sixth lens L6;

R13: curvature radius of the object-side surface of the seventh lens L7;

R14: curvature radius of the image-side surface of the seventh lens L7;

R15: curvature radius of the object-side surface of the eighth lens L8;

R16: curvature radius of the image-side surface of the eighth lens L8;

R17: curvature radius of the object-side surface of the ninth lens L9;

R18: curvature radius of the image-side surface of the ninth lens L9;

d: on-axis thickness of the lens and on-axis distance between the lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the sixth lens L6;
d11: on-axis thickness of the sixth lens L6;
d12: on-axis distance from the image-side surface of the sixth lens L6 to the object-side surface of the seventh lens L7;
d13: on-axis thickness of the seventh lens L7;
d14: on-axis distance from the image-side surface of the seventh lens L7 to the object-side surface of the eighth lens L8;
d15: on-axis thickness of the eighth lens L8;
d16: on-axis distance from the image-side surface of the eighth lens L8 to the object-side surface of the ninth lens L9;
d17: on-axis thickness of the ninth lens L9;
d18: on-axis distance from the image-side surface of the ninth lens L9 to the object-side surface of the optical filter;
nd: refractive index of the d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
nd8: refractive index of d line of the eighth lens L8;
nd9: refractive index of d line of the ninth lens L9;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the eighth lens L8; and
v9: abbe number of the ninth lens L9.

Figure 2:
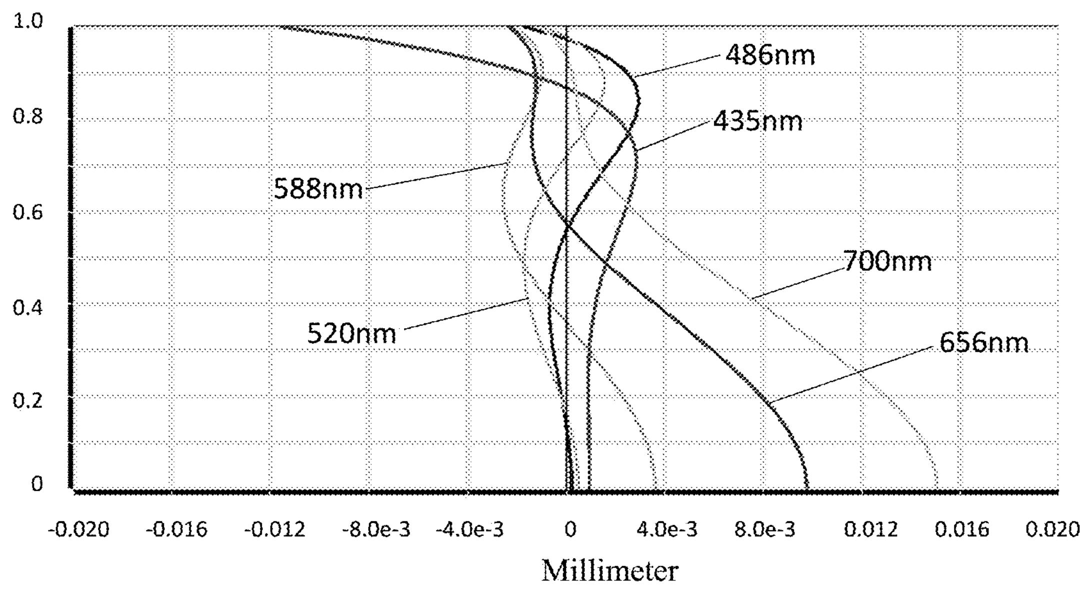
FIG. 2 is a schematic diagram of longitudinal aberration of the microscope objective lens shown in FIG. 1.
Figure 3:
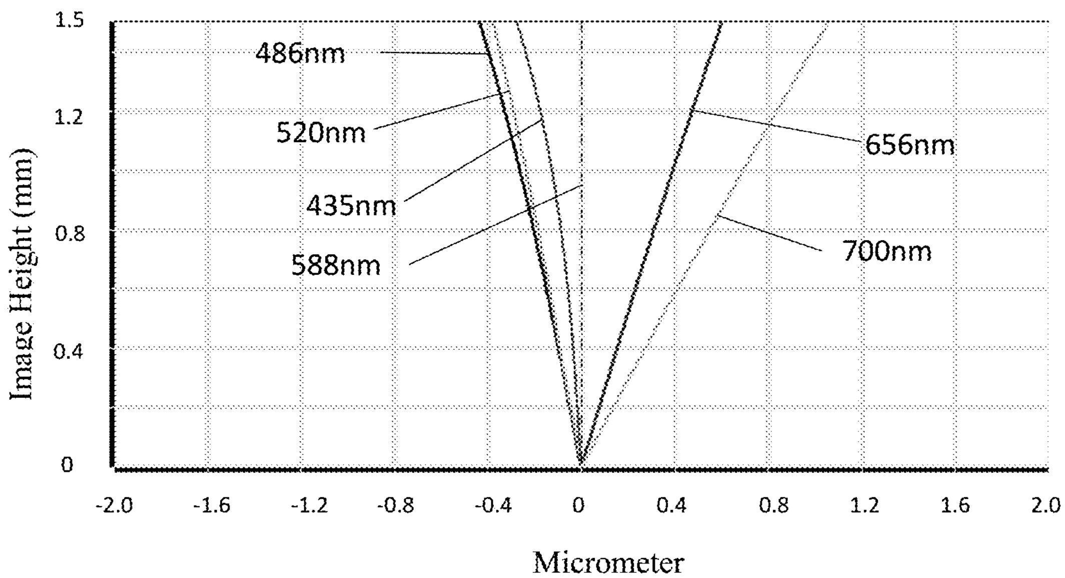
FIG. 3 is a schematic diagram of lateral color of the microscope objective lens shown in FIG. 1.
Figure 4:
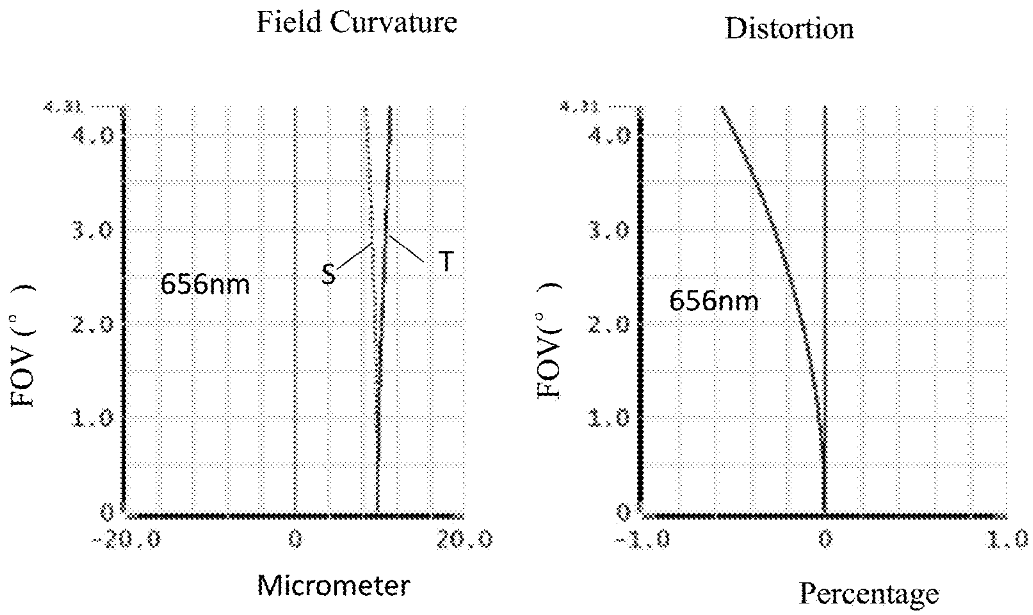
FIG. 4 is a schematic diagram of field curvature and distortion of the microscope objective lens shown in FIG. 1.
Figure 5:
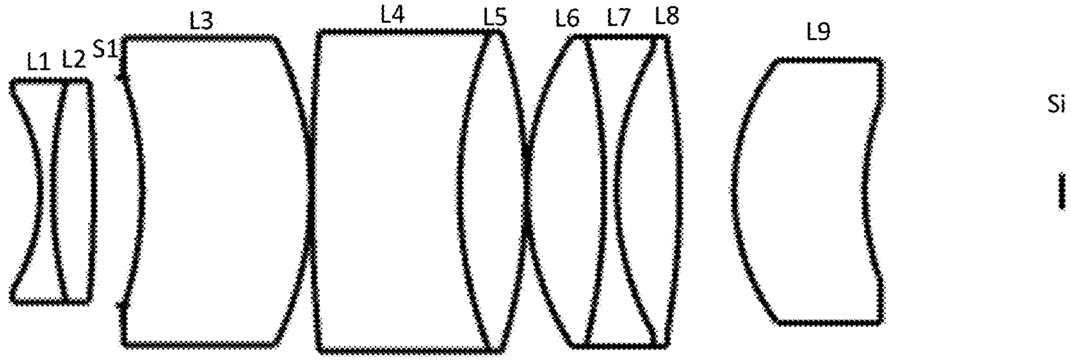
FIG. 5 is a structural schematic diagram of a microscope objective lens according to Embodiment 2 of the present disclosure.

FIG. 2 and FIG. 3 respectively show longitudinal aberration and lateral color of light with wavelengths of 700 nm, 656 nm, 588 nm, 520 nm, 486 nm and 435 nm after passing through the microscope objective lens 10 of the first embodiment. FIG. 4 shows field curvature and distortion of light with a wavelength of 656 nm after passing through the microscope objective lens 10 of the first embodiment, the field curvature S of FIG. 4 is field curvature in a sagittal direction, and T is field curvature in a meridional direction.

Table 4 below shows values corresponding to various values in each example 1, example 2, and example 3 and parameters already specified in the relational expressions.

As shown in Table 4, embodiment 1 satisfies each relational expression.

In this embodiment, the microscope objective lens 10 has the entrance pupil diameter of 12.6 mm, the full field of view image height of 1.5 mm, the field of view in the diagonal direction of 8.62°, the object numerical aperture NA of 0.30, the magnification of 10 times, and the working wave band of 486 nm to 700 nm, which has good optical performance.

Embodiment 2

Embodiment II is substantially the same as embodiment 1, and the symbols have the same meaning as embodiment 1, and only differences are listed below.

In this embodiment, the image-side surface of the second lens L2 is convex in a paraxial region.

Table 2 shows design data of a microscope objective lens 20 according to the second embodiment of the present disclosure.

TABLE 2

| | R | d | | nd | | vd | |
|---|---|---|---|---|---|---|---|
| S1 | ∞ | d0 = | −6.858 | | | | |
| R1 | −16.029 | d1 = | 1.050 | nd1 | 1.6180 | v1 | 63.41 |
| R2 | 39.132 | d2 = | 0.000 | | | | |
| R3 | 39.132 | d3 = | 3.400 | nd2 | 2.0007 | v2 | 25.43 |
| R4 | −114.358 | d4 = | 4.013 | | | | |
| R5 | −31.449 | d5 = | 14.030 | nd3 | 1.8830 | v3 | 40.85 |
| R6 | −29.649 | d6 = | 0.099 | | | | |
| R7 | 149.315 | d7 = | 12.280 | nd4 | 1.8501 | v4 | 30.06 |
| R8 | 37.631 | d8 = | 0.000 | | | | |
| R9 | 37.631 | d9 = | 5.510 | nd5 | 1.5928 | v5 | 68.34 |
| R10 | −44.934 | d10 = | 0.098 | | | | |
| R11 | 24.690 | d11 = | 6.400 | nd6 | 1.4378 | v6 | 94.52 |
| R12 | −56.137 | d12 = | 0.000 | | | | |
| R13 | −56.137 | d13 = | 1.050 | nd7 | 1.8467 | v7 | 23.79 |
| R14 | 25.271 | d14 = | 0.000 | | | | |
| R15 | 25.271 | d15 = | 5.210 | nd8 | 1.4565 | v8 | 90.47 |
| R16 | −69.875 | d16 = | 4.544 | | | | |
| R17 | 18.849 | d17 = | 10.870 | nd9 | 1.9460 | v9 | 17.94 |
| R18 | 23.037 | d18 = | 16.401 | | | | |

Figure 6:
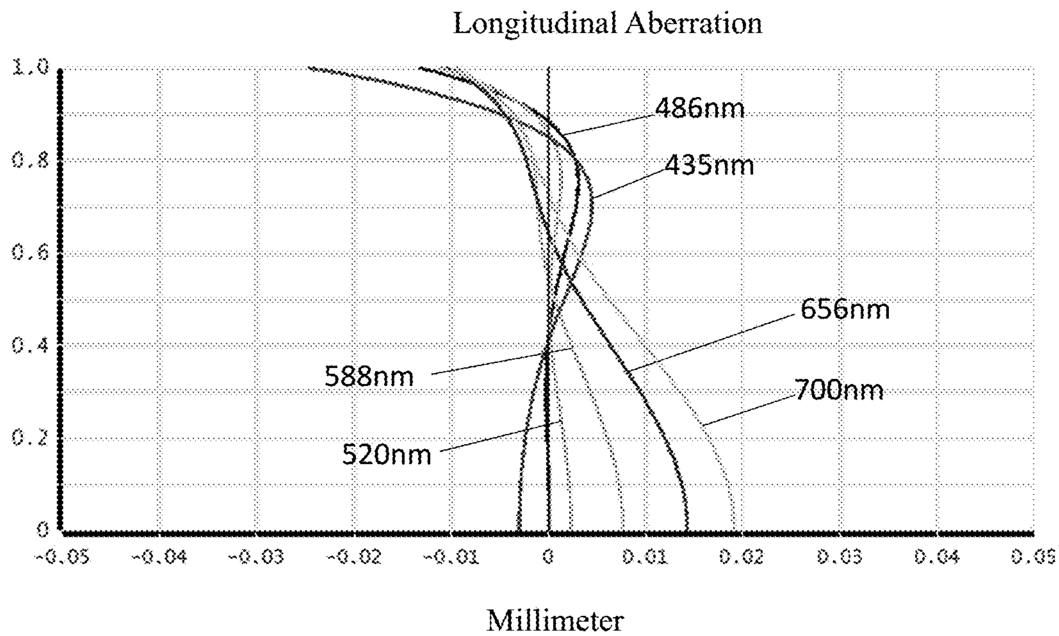
FIG. 6 is a schematic diagram of longitudinal aberration of the microscope objective shown in FIG. 5.
Figure 7:
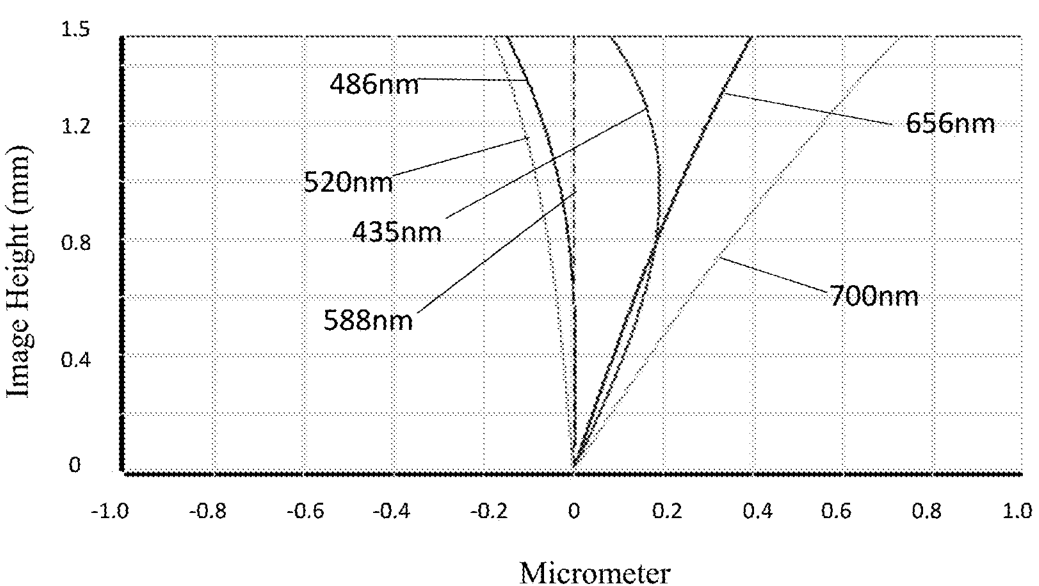
FIG. 7 is a schematic diagram of lateral color of the microscope objective lens shown in FIG. 5.
Figure 8:
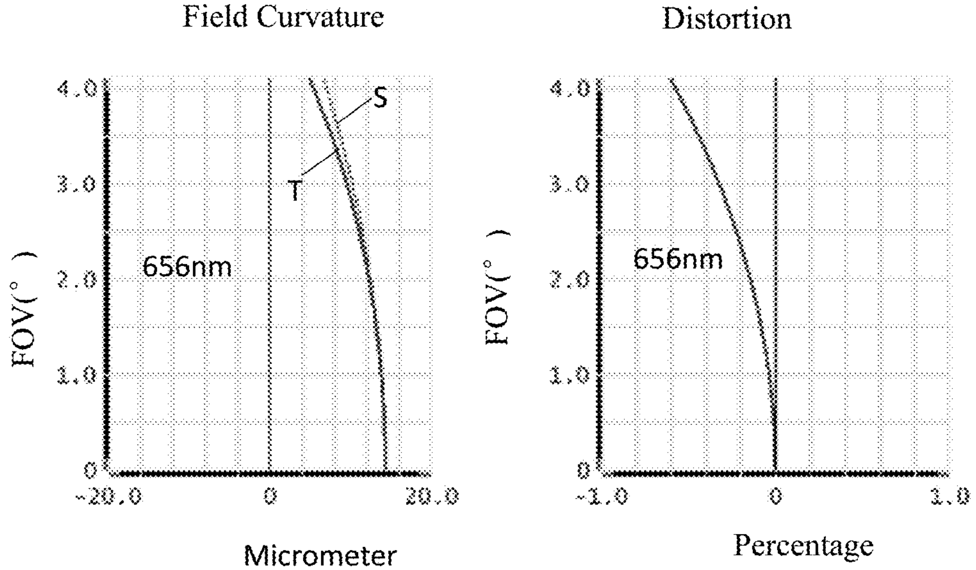
FIG. 8 is a schematic diagram of field curvature and distortion of the microscope objective lens shown in FIG. 5.
Figure 9:
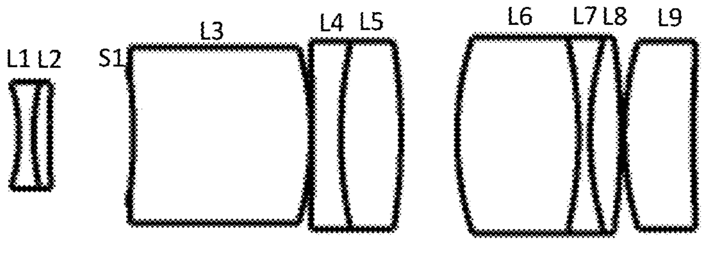
FIG. 9 is a structural schematic diagram of a microscope objective lens according to Embodiment 3 of the present disclosure.

FIG. 6 and FIG. 7 respectively show the longitudinal aberration and lateral color of light with wavelengths of 700 nm, 656 nm, 588 nm, 520 nm, 486 nm and 435 nm after passing through the microscope objective lens 20 of embodiment 2. FIG. 8 shows field curvature and distortion of light with a wavelength of 656 nm after passing through the microscope objective lens 20 according to embodiment 2, the field curvature S in FIG. 8 is the field curvature in a sagittal direction, and T is the field curvature in a meridional direction.

Table 4 below shows values corresponding to various values in each example 1, example 2, and example 3 and parameters already specified in the relational expressions.

As shown in Table 4, embodiment 2 satisfies each relational expression.

In this embodiment, the microscope objective lens 20 has the entrance pupil diameter of 8 mm, the field of view image height of 1.5 mm, the field of view in a diagonal direction of 8.22°, the object numerical aperture NA of 0.19, the magnification of 10 times, and the working wave band of 486 nm to 700 nm, which has good optical performance.

Embodiment 3

Embodiment 3 is substantially the same as embodiment 1, and the symbols have the same meaning as embodiment 1, and only differences are listed below.

In this embodiment, the object-side surface of the fourth lens L4 is concave in a paraxial region.

Table 3 shows design data of a microscope objective lens 30 according to Embodiment 3 of the present disclosure.

TABLE 3

| | R | d | | nd | | vd | |
|---|---|---|---|---|---|---|---|
| S1 | ∞ | d0 = | −9.468 | | | | |
| R1 | −15.262 | d1 = | 1.253 | nd1 | 1.6180 | v1 | 63.41 |
| R2 | 21.128 | d2 = | 0.000 | | | | |
| R3 | 21.128 | d3 = | 1.363 | nd2 | 2.0007 | v2 | 25.43 |
| R4 | 71.236 | d4 = | 7.262 | | | | |
| R5 | −45.197 | d5 = | 15.331 | nd3 | 1.8830 | v3 | 40.85 |
| R6 | −28.901 | d6 = | 0.100 | | | | |
| R7 | −284.756 | d7 = | 2.506 | nd4 | 1.8501 | v4 | 30.06 |
| R8 | 40.447 | d8 = | 0.000 | | | | |
| R9 | 40.447 | d9 = | 5.194 | nd5 | 1.5928 | v5 | 68.34 |
| R10 | −51.991 | d10 = | 4.845 | | | | |
| R11 | 28.309 | d11 = | 10.500 | nd6 | 1.4378 | v6 | 94.52 |
| R12 | −38.266 | d12 = | 0.000 | | | | |
| R13 | −38.266 | d13 = | 1.000 | nd7 | 1.8467 | v7 | 23.79 |
| R14 | 30.414 | d14 = | 0.000 | | | | |
| R15 | 30.414 | d15 = | 2.654 | nd8 | 1.4565 | v8 | 90.47 |
| R16 | −58.062 | d16 = | 0.313 | | | | |
| R17 | 28.951 | d17 = | 5.957 | nd9 | 1.9460 | v9 | 17.94 |
| R18 | 144.673 | d18 = | 32.725 | | | | |

Figure 10:
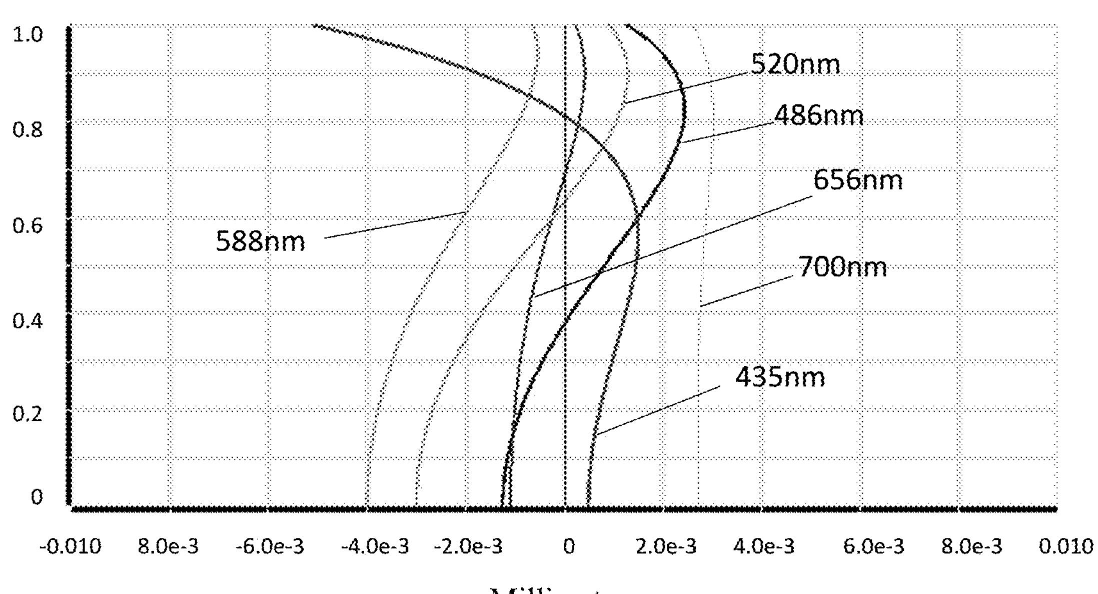
FIG. 10 is a schematic diagram of longitudinal aberration of the microscope objective shown in FIG. 9.
Figure 11:
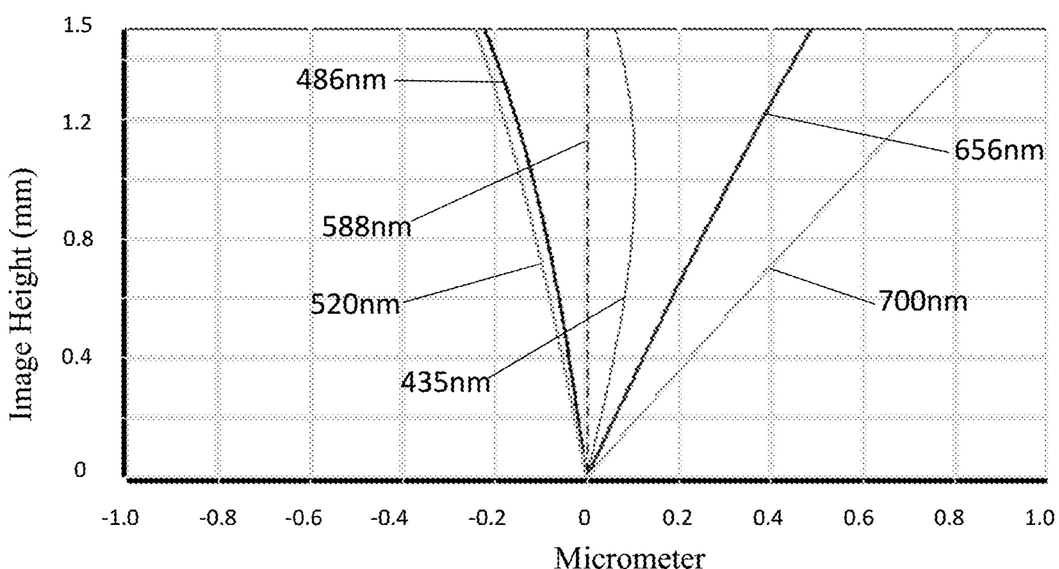
FIG. 11 is a schematic diagram of lateral color of the microscope objective lens shown in FIG. 9.
Figure 12:
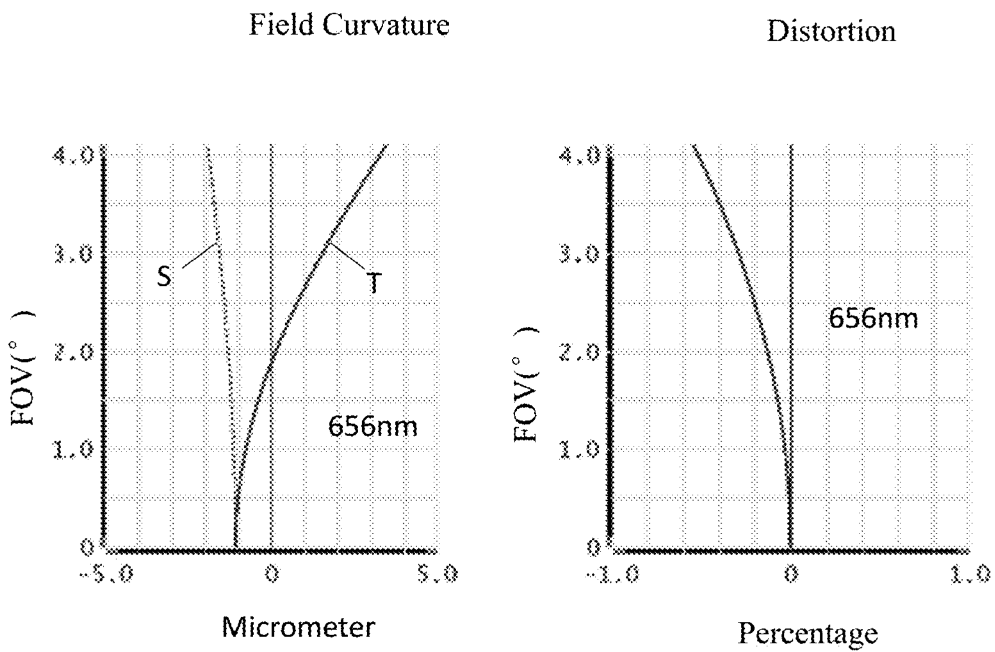
FIG. 12 is a schematic diagram of field curvature and distortion of the microscope objective shown in FIG. 9.

FIG. 10 and FIG. 11 respectively show the longitudinal aberration and lateral color of light with wavelengths of 700 nm, 656 nm, 588 nm, 520 nm, 486 nm and 435 nm after passing through the microscope objective lens 30 of embodiment 3. FIG. 12 shows field curvature and distortion of light with a wavelength of 656 nm after passing through the microscope objective lens 30 according to embodiment 3, the field curvature S in FIG. 12 is the field curvature in a sagittal direction, and T is the field curvature in a meridional direction.

Table 4 below shows values corresponding to various values in each example 1, example 2, and example 3 and parameters already specified in the relational expressions.

As shown in Table 4, embodiment 3 satisfies each relational expression.

In this embodiment, the microscope objective lens 30 has the entrance pupil diameter of 16 mm, the field of view image height of 1.5 mm, and the field of view in a diagonal direction of 8.22°, the object numerical aperture NA of 0.38, the magnification of 10 times, the working wave band of 486 nm to 700 nm, which has good optical performance.

TABLE 4

| Parameters and Relational Expressions | Example 1 | Example 2 | Example 3 |
|---|---|---|---|
| WD/TTL | 0.28 | 0.19 | 0.36 |
| NA*f | 6.00 | 8.00 | 4.00 |
| f678/f9 | 11.91 | 7.00 | 16.00 |
| (R17 + R18)/(R17 − R18) | −2.72 | −10.00 | −1.50 |
| f | 20.014 | 21.015 | 21.000 |
| f1 | −14.925 | −35.050 | −45.848 |
| f2 | 31.801 | 54.393 | 235.905 |
| f3 | 80.693 | 126.016 | 62.991 |
| f4 | −53.682 | −1128.356 | −106.686 |
| f5 | 36.134 | 150.002 | 189.526 |
| f6 | 41.556 | 90.717 | 167.028 |
| f7 | −21.861 | −43.885 | −42.395 |
| f8 | 47.211 | −117.019 | −209.094 |
| f9 | 42.661 | 48.460 | 37.328 |
| f12 | 507.914 | −19.442 | −16.096 |
| NA | 0.30 | 0.19 | 0.38 |

wherein, f12 is a combined focal length of the first lens and the second lens.

Those skilled in the art can understand that the above embodiments are specific embodiments for implementing the present disclosure, and in practical applications, various changes may be made in form and detail without departing from the spirit and scope of the present disclosure.

What is claimed is:

1. A microscope objective lens, comprising from an object side to an image side:

a first lens having a negative refractive power, a second lens having a positive refractive power, a third lens having a positive refractive power, a fourth lens having a negative refractive power, a fifth lens having a positive refractive power, a sixth lens having a positive refractive power, a seventh lens having a negative refractive power, an eighth lens having a positive refractive power; and a ninth lens having a positive refractive power;

wherein a distance from an object-side surface of the first lens to an observed object is WD, a total optical length from the object-side surface of the first lens to an image plane of the camera optical lens along an optic axis of the microscope objective lens is TTL, an object numerical aperture of the microscope objective lens is NA, a focal length of the microscope objective lens is f, an equivalent focal length of the sixth lens, the seventh lens and the eighth lens is f678, a focal length of the ninth lens is f9, a curvature radius of an object-side surface of the ninth lens is R17, a curvature radius of an image-side surface of the ninth lens is R18, a focal length of the third lens is f3, and following relational expressions are satisfied:

$$0.19 \le WD/TTL \le 0.36;$$

$$4.00 \le NA \times f \le 8.00;$$

$$7.00 \le f678/f9 \le 16.00;$$

$$3.00 \le f3/f \le 6.00; \text{ and}$$

$$-10.00 \le (R17 + R18)/(R17 - R18) \le -1.50.$$

2. The microscope objective lens as described in claim 1, wherein a refractive index of the second lens is n2, and a following relational expression is satisfied:

$n2 \ge 2.00$.

3. The microscope objective lens of claim 1, wherein the object-side surface of the first lens is concave in a paraxial region, and an image-side surface of the first lens is concave in the paraxial region; and a focal length of the first lens is f1, a curvature radius of the object-side surface of the first lens is R1, a curvature radius of the image-side surface of the first lens is R2, an on-axis thickness of the first lens is d1, and following relational expressions are satisfied:

$$0.87 \le f1/f \le 0.66;$$

$$-0.42 \le (R1 + R2)/(R1 - R2) \le -0.16; \text{ and}$$

$$0.01 \le d1/TTL \le 0.02.$$

4. The microscope objective lens as described in claim 1, wherein the object-side surface of the second lens is convex in a paraxial region; and a focal length of the second lens is f2, a curvature radius of the object-side surface of the second lens is R3, a curvature radius of an image-side surface of the second lens is R4, an on-axis thickness of the second lens is d3, and following relational expressions are satisfied:

$$1.40 \le f2/f \le 1.59;$$

$$-1.85 \le (R3+R4)/(R3-R4) \le -0.49; \text{ and}$$

$$0.01 \le d3/TTL \le 0.05.$$

5. The microscope objective lens as described in claim 1, wherein the object-side surface of the third lens is concave in a paraxial region, and an image-side surface of the third lens is convex in the paraxial region; and a curvature radius of the object-side surface of the third lens is R5, a curvature radius of the image-side surface of the third lens is R6, an on-axis thickness of the third lens is d5, and following relational expressions are satisfied:

$$4.50 \le (R5+R6)/(R5-R6) \le 34.00; \text{ and}$$

$$0.15 \le d5/TTL \le 0.17.$$

6. The microscope objective lens as described in claim 1, wherein the image-side surface of the fourth lens is concave in a paraxial region; and a focal length of the fourth lens is f4, and an on-axis thickness of the fourth lens is d7, and following relational expressions are satisfied:

$$2.97 \le f4/f \le 1.96; \text{ and}$$

$$0.02 \le d7/TTL \le 0.15.$$

7. The microscope objective lens as described in claim 1, wherein the object-side surface of the fifth lens is convex in a paraxial region, and an image-side surface of the fifth lens is convex in the paraxial region; and a focal length of the fifth lens is f5, a curvature radius of the object-side surface of the fifth lens is R9, a curvature radius of the image-side surface of the fifth lens is R10, an on-axis thickness of the fifth lens is d9, and following relational expressions are satisfied:

$$1.68 \le f5/f \le 1.87;$$

$$-0.13 \le (R9+R10)/(R9-R10) \le 0.09; \text{ and}$$

$$0.05 \le d9/TTL \le 0.07.$$

8. The microscope objective lens as described in claim 1, wherein the object-side surface of the sixth lens is convex in a paraxial region, and an image-side surface of the sixth lens is convex in the paraxial region; and a focal length of the sixth lens is f6, a curvature radius of the object-side surface of the sixth lens is R11, a curvature radius of the image-side surface of the sixth lens is R12, an on-axis thickness of the sixth lens is d11, and following relational expressions are satisfied:

$$1.85 \le f6/f \le 2.08;$$

$$-0.39 \le (R11+R12)/(R11-R12) \le -0.14; \text{ and}$$

$$0.07 \le d11/TTL \le 0.12.$$

9. The microscope objective lens as described in claim 1, wherein the object-side surface of the seventh lens is concave in a paraxial region, and an image-side surface of the seventh lens is concave in the paraxial region; and a focal length of the seventh lens is f7, a curvature radius of the object-side surface of the seventh lens is R13, a curvature radius of the image-side surface of the seventh lens is R14, an on-axis thickness of the seventh lens is d13, and following relational expressions are satisfied:

$$1.10 \le f7/f \le 0.94;$$

$$0.11 \le (R13+R14)/(R13-R14) \le 0.38; \text{ and}$$

$$0.01 \le d13/TTL \le 0.02.$$

10. The microscope objective lens as described in claim 1, wherein an object-side surface of the eighth lens is convex in a paraxial region, and an image-side surface of the eighth lens is convex in the paraxial region; and a focal length of the eighth lens is f8, a central curvature radius of the object-side surface of the eighth lens is R15, a central curvature radius of the image-side surface of the eighth lens is R16, an on-axis thickness of the eighth lens is d15, and following relational expressions are satisfied:

$$1.90 \le f8/f \le 2.36;$$

$$-0.55 \le (R15+R16)/(R15-R16) \le -0.31; \text{ and}$$

$$0.02 \le d15/TTL \le 0.07.$$

11. The microscope objective lens as described in claim 1, wherein the object-side surface of the ninth lens is convex in a paraxial region, and the image-side surface of the ninth lens is concave in the paraxial region;

an on-axis thickness of the ninth lens is d17, and following relational expressions are satisfied:

$$1.77 \le f9/f \le 2.31; \text{ and}$$

$$0.06 \le d17/TTL \le 0.13.$$

12. The microscope objective lens as described in claim 1, wherein the first lens, the second lens, the third lens, the fourth lens, the fifth lens, the sixth lens, the seventh lens, the eighth lens and the ninth lens are all made of glass.

* * * * *